INVENTOR
RUSSELL S. CRENSHAW Jr.

BY W. R. Maltby
D. C. Snyder
ATTORNEYS

INVENTOR
RUSSELL S. CRENSHAW Jr.

ATTORNEYS

United States Patent Office 2,750,549
Patented June 12, 1956

2,750,549

MOTOR CONTROL SYSTEM

Russell Sydnor Crenshaw, Jr., Claremont, Calif.

Application June 1, 1953, Serial No. 358,991

3 Claims. (Cl. 318—207)

(Granted under Title 35, U. S. Code (1952), sec. 266)

The invention described herein may be manufactured and used by or for the Government of the United States of America for governmental purposes without the payment of any royalties thereon or therefor.

The present invention relates generally to variable impedance control systems and more particularly to apparatus for and methods of regualting polyphase rotary equipment.

As is well known in the motor control art, the problem of controlling the direction of rotation of a polyphase motor involves primarily the establishment of predetermined phase relationships between the various voltages applied to the stator windings. For example, in the case of a three-phase induction motor, interchanging the line connections of any two of the three phases energizing the stator wil cause the rotor to assume a reversed direction of rotation. Ordinarily, such phase changes are effected by resorting to line switching mechanisms or to tap changing transformer systems. Such representative arrangements, however, as well as most of the techniques currently in use, while providing acceptable solutions for the majority of industrial control problems, cannot be effectively employed in installations where a high degree of sensitivity and responsiveness is demanded. The defection of existing equipment, which precludes their application to such system as, for example, servo-control circuits, may be attributed to the fact that the prior art controllers are essentially electromechanical assemblies, utilizing relatively complex structural components and movements in performing their operational sequences. Because of the cumulative inertia of their mechanical linkages, undesirable time delays are introduced into the control system; and because of their mechanical natures, constant service and maintenance are required. A further drawback delimiting their usefulness and one that especially disqualifies them from the field of servomechanisms is their need of appreciable high levels of operating power.

It is also well known that the torque delivered by a polyphase motor may be controlled by regulating the magnitudes of the phase voltages supplying the stator. However, here, too, the same disadvantages encountered in the phase-switching mechanisms, namely, slowness of response, need of relatively high operating power and constant supervision are also found.

It is accordingly a primary object of the present invention to provide a simple and sensitive control system for regulating both the torque and direction of rotation of polyphase motors.

A second object of the present invention is to provide a polyphase motor controller capable of performing with low levels of control power.

A further object resides in the provision of a variable impedance control circuit for reversing the phase sequence of the terminal voltages applied to a polyphase motor.

A still further object of the present invention is to provide a regulator in which a group of impedance elements control both the magnitude and phase sequence of the voltages applied to the stator terminals of a polyphase motor.

A further object of the present invention is to provide a controller for permitting both the torque and direction of rotation of a polyphase motor to be controlled by a single electrical adjustment.

A still further object of the present invention is to provide a controller for regulating both the direction of rotation and the speed of a polyphase motor.

A still further object of the invention is to provide a three-phase saturable core reactor of simple and rugged mechanical construction.

Briefly, these and other objects are realized according to the present invention by utilizing the extreme variations of inductance obtainable from conventional saturable core reactors to effectively duplicate the electrical performance of line switching mechanisms. Such extreme differences in inductance may be readily obtained by varying the degree of magnetic polarization of the core member between limits approximating saturation and unsaturation. The reactance values of the coil members associated with such a core member will follow these variations of core saturation presenting maximum inductance at unsaturation and minimum inductance at saturation. By properly designing the core member and its windings, these maximum and minimum values of inductance may, for practical purposes, react in their A. C. circuits as open and closed switch elements. This characteristic is made use of in the present invention by permanently connecting the stator windings of a polyphase motor to a polyphase supply source via a first and second phase sequence, corresponding to different directions of rotation, and by oppositely varying the reactance of a pair of polyphase saturable core reactors having their windings in series with the individual supply lines of each phase sequence, to render one or the other of these phase sequences effective. If in such an arrangement a starting point is preselected where all the windings display equally high reactance, notwithstanding the permanent connections to the supply source, the motor will be maintained inoperative, commencing to rotate only when the terminal voltages of one phase sequence predominate over those of the other phase sequence. The torque output will also be controllable and at any one time will be inversely proportional to the magnitude of the reactance of that set of reactors whose values have been lowered by the above variation to establish the direction of motor rotation.

Besides permitting both the direction of rotation and the torque output of the polyphase motor to be regulated, the variable impedance characteristics of the saturable core reactors may also be employed to obtain speed regulation of this motor. In conventional polyphase induction motors having relatively low armature resistance, the torque increases exponentially from an intermediate value at standstill to a maximum in the vicinity of synchronous speed, then falls off abruptly to zero at synchronous speed. If the armature resistance of such a motor is suitably increased, however, the torque versus speed curve will become substantially linear, with maximum torque output at standstill and zero torque at synchronous speed. Since the torque output can thus be made to vary linearly with speed and since the torque, as is well known, is proportionally related to the magnitude of the terminal voltages, the speed therefore can be effectively controlled by maintaining a fixed load on the motor and varying the absolute magnitude of the terminal voltages. With a finite load, it is possible with this method to realize speed control from standstill to approximately synchronous speed. With no load, the inherent friction of the motor permits similar speed regulation.

This method of speed regulation, equally applicable to squirrel cage motors and motors having wound rotors, has particular usefulness in servo-control systems where it is highly desirable to have a motor speed proportional to input signal. Thus, by varying the reactance of the polyphase saturable core reactors in the manner suggested above, the direction of motor rotation and the speed or torque may be readily controlled.

Other objects and many of the attendant advantages of this invention will be readily appreciated as the same becomes better understood by reference to the following detailed description when considered in connection with the accompanying drawings wherein.

Figure 1:
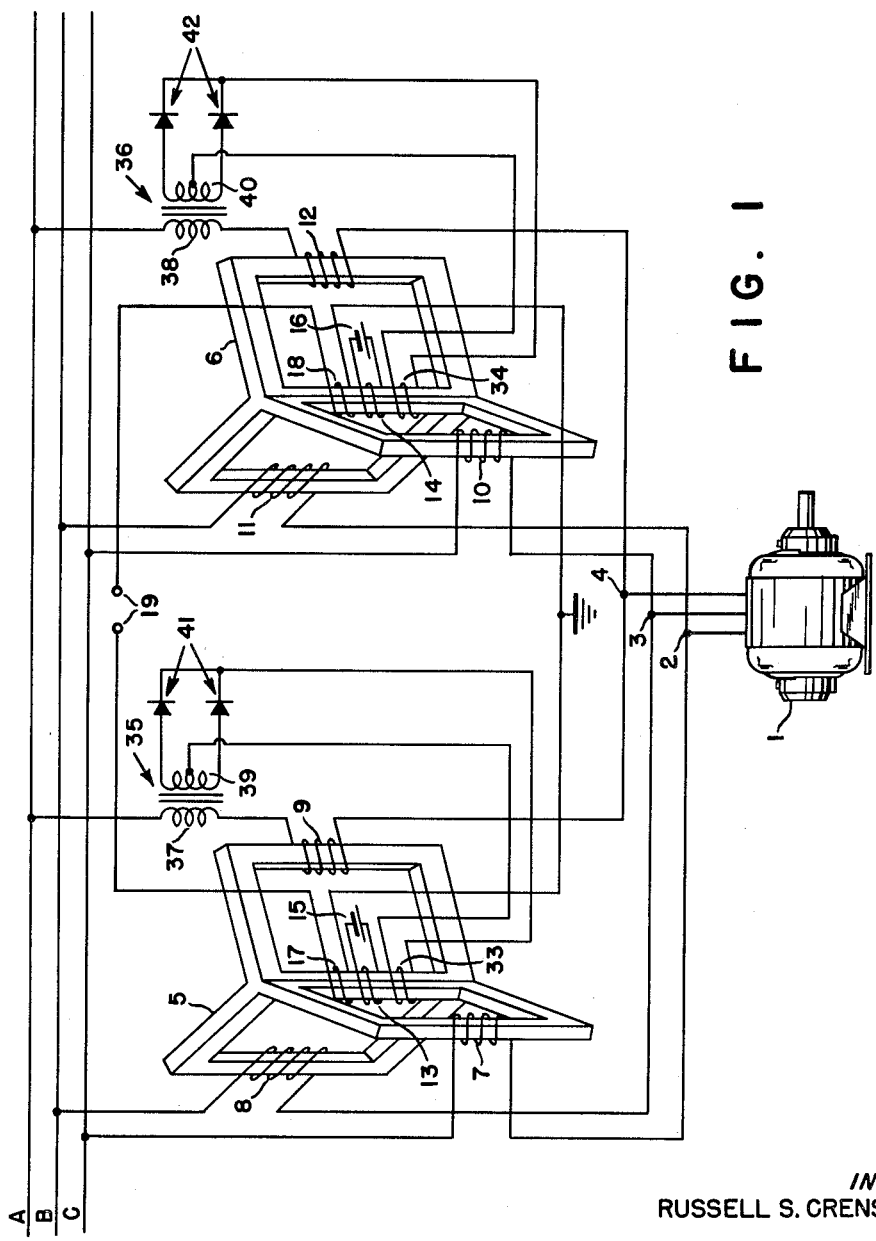
Fig. 1 is a circuit diagram of a preferred embodiment of the present invention illustrating a control system for regulating the torque and direction of rotation of a three-phase induction motor.

Referring now to Fig. 1, there is shown a conventional three-phase induction motor 1 having the external connections to its constituent stator windings identified by reference characters 2, 3 and 4. Associated with this motor are a pair of electrically and mechanically similar three-phase saturable core reactors 5 and 6, each of which is fabricated with upper and lower Y-shaped core sections having their extremities joined by a plurality of parallel outer legs on which windings 7, 8, 9 and 10, 11 and 12 are disposed. Stator winding 2 is permanently connected to phase "C" of the three-phase supply source ABC via winding 7 of reactor 5. At the same time, this winding is also permanently connected to phase "B" of the above supply source via winding 11 of reactor 6. Similarly, stator winding 3 is permanently wired to phases "B" and "C" via windings 8 and 10, respectively. The remaining stator winding 4 is connected to phase "A" only via windings 9 and 12 of reactors 5 and 6, respectively. Thus, motor 1 is simultaneously capable of energization from a first phase sequence CBA and a second phase sequence BCA, with each of these sequences corresponding to or determining a preselected direction of motor rotation.

Reactors 5 and 6 are designed with central leg members on which the various control windings are mounted. A first pair of these coil windings, elements 13 and 14, possessing identical electrical characteristics, are wound in the same relative direction so that, when energized by their local batteries 15 and 16, both establish equal degrees of direct magnetic polarization in the same spatial direction in their core members. The function and purpose of these coils or bias windings, which is to maintain the quiescent flux density of the core members at a level corresponding to the knee portion of their magnetization curves, will be explained hereinafter.

A second pair of control windings, 17 and 18, are also mounted on the central leg members of reactors 5 and 6 and these windings may be either superimposed on the first pair of windings or displaced therefrom, as desired. However, unlike the bias windings, these coils are wound in opposite directions, then connected in a series relationship in an external circuit. A control signal which is of a D. C. nature with variable amplitude and reversible polarity is applied across input terminals 19 and, due to the different winding directions of coils 17 and 18, produced opposite magnetization effects in the central leg members of the saturable core reactors.

A third pair of control windings, 33 and 34, wound in the same spatial directions as bias windings 13 and 14, respectively, are also mounted on the central core legs of polyphase saturable core reactors 5 and 6. These windings, which assist control windings 17 and 18 in providing magnetic core saturation, derive their energization from the rectified output of feedback transformers 35 and 36, the primary windings of which, 37, and 38, can be connected in any phase of the three-phase supply source phases A, B, C.

The operation of the system is as follows: Normally, with an absence of D. C. control signal at terminal 19, the current flow through bias windings 13 and 14 is regulated by batteries 15 and 16 to maintain a degree of direct magnetic polarizing intensity in the core members such that reactors 5 and 6 have as their A. C. operating point the knee portion of their magnetization curves. The purpose of operating at this point is twofold: first, to have the individual windings 7, 8, 9 and 10, 11, 12 present equal and relatively high reactance to their individual A. C. supply lines; and second, to have small changes in the amplitude of the D. C. control signals produce relatively large changes in the inductance of these windings. Since the inductance of the various windings is proportional to the incremental permeability of their cores and since the greatest changes in incremental permeability occur in the vicinity of the knee portion of the magnetization curve, this latter point defines the optimum operational location as far as considerations of sensitivity are concerned.

In the initial balance condition, namely, with all windings exhibiting equal and relatively high reactance, little current will flow through the stator windings of polyphase motor 1 and that which does, it has been found, will be effectively of a single-phase nature and, therefore, incapable of instituting motor rotation in either direction. Should it be found desirable to have this residual single-phase field eliminated, any of many simple arrangements may be utilized to buck it out. For example, in a Y-connected machine, an additional winding added to the constant or nonshifting phase, "A" in the present circuit, will accomplish this purpose. Where the present invention is to be used in servo and accurate speed control systems, the three-phase motor preferably should possess sufficient armature resistance to deliver maximum torque at standstill. In this way, too, the residual A. C. field is rendered ineffective because under such conditions the motor will not single phase. Thus, although polyphase motor 1 is permanently connected to the three-phase supply source ABC, its stator will normally remain stationary.

If now a D. C. control signal is applied to terminals 19 due to the opposite winding directions of coils 17 and 18, the D. C. magnetizing force produced thereby will act in opposite spatial directions in the central leg portions of the cores. For example, if that produced in core 5 adds to the quiescent flux produced by bias winding 13, that in core 6 will subtract from the flux produced by winding 14. In such a case, the net result is that the A. C. operating point of reactor 5 moves from its location at the knee portion of the magnetization curve upward along this curve toward core saturation, whereas the A. C. operating point of reactor 6 experiences a downward displacement along its curve toward core unsaturation. As a direct consequence of relocating the A. C. operating points of saturable core reactors 5 and 6, windings 7, 8 and 9 decrease in inductance and windings 10, 11 and 12 increase in inductance. With greater terminal voltages now obtainable from phase sequence CBA than from BCA because of the reduced impedances of coils 7, 8 and 9, an effective three-phase current appears in the stator windings and motor 1 commences to rotate in a direction determined by the former phase sequence. If the amplitude of the D. C. control signal is increased to a sufficient magnitude, core member 5 will operate in the vicinity of core saturation and as a consequence, its windings will present minimum inductance to their A. C. supply lines. Core member 6, however, will operate in the vicinity of unsaturation and therefore its windings will exhibit maximum inductance to their A. C. lines. Thus, in effect, polyphase motor 1 is electrically isolated from phase sequence BCA due to the high impedance of coils 10, 11 and 12 and operates solely under the influence of phase sequence CBA, with practically full voltage at its stator windings.

To increase the sensitivity of the control systems, that is, to minimize the magnitude of the control signal required at terminal 19 for a given range of control, additional saturating windings, 33 and 39, wound in the same spatial directions as bias windings 13 and 14, are disposed on the central core legs of the polyphase saturable core reactors. These windings which function to aid control windings 17 and 18 in achieving core saturation are connected in feedback circuits which include transformers 35 and 36. In the particular case illustrated, the primary windings of these transformer elements 37 and 38, are connected in phase A in series with coils 9 and 12, respectively. The secondary windings of these transformers, 39 and 40, are center tapped and their outputs, after rectification by conventional means 41 and 42, are directly fed to windings 33 and 34.

The operation of the feedback circuit is as follows: When the impedance of coil 9 is initially reduced in response to the application of a control signal to terminal 19 as explained hereinabove, the increased voltage available at primary winding 37 of transformer 35 causes a predetermined increase in the output voltage appearing across secondary winding 39. The resultant increase in current flow through winding 33 produces a greater magnetizing force and this force combines with that available from winding 17 to move core 5 a step closer to magnetic saturation. Since the degree of magnetic saturation of this core is now increased, the impedance of coil 9 experiences a further reduction in magnitude. This reduction is accompanied by a greater output voltage from transformer secondary 39, a still greater magnetizing force from winding 33, and a further movement of core 5 toward magnetic saturation. This action is thus seen to be of a regenerative nature, continuing until a point of equilibrium is reached, the location of which is determined in part by the amplitude of the input control signal and in part by the inherent losses present in the feedback circuit. Thus, by making use of the above feedback technique, the absolute magnitude of the control signal needed at terminal 19 to achieve a specific degree of core saturation is substantially reduced and the sensitivity of the system is consequently enhanced.

To change the direction of motor rotation or to start this motor in a direction opposite to that already obtained, it is only necessary to reverse the polarity of the D. C. control signal. If, in the former instance, such a change is made, the magnetizing force created by coil 17 now conflicts with that produced by bias winding 13, while the equivalent magnetizing force in core 6 assists that created by bias winding 14. Consequently, core member 5 departs from a condition approximating saturation, moving in a direction towards unsaturation, and core member 6 experiences the opposite effect moving toward saturation. If this process is continued by progressively increasing the amplitude of the control signal, the reactance of coils 7, 8 and 9 finally increases to a maximum and that of coils 10, 11 and 12 diminishes to a minimum. However, before these extremes are reached, a condition will exist whereat the inductance of the latter coils is less than that of the former coils. As soon as this occurs, a three-phase current corresponding to the phase sequence BCA will exist in the stator windings of motor 1 and the motor will reverse its direction of rotation. In the final condition with windings 10, 11 and 12 demonstrating minimum inductance to their supply lines, motor 1 will be effectively disconnected from phase sequence CBA and rotate under the sole influence of phase sequence BCA, with practically full terminal voltages and maximum torque output.

It will also be appreciated that during the above sequence of events winding 34 and its associated feedback transformer 36 assist control winding 18 in producing magnetic saturation of polyphase reactor 6. In this respect, their performance is the same as that of winding 33 and transformer 35 in the previous description presented in connection with the core saturation of reactor 5.

Since the D. C. control signal accomplishes the above phase-shifting action by progressively increasing the terminal voltages of the selected phase sequence from a first relatively low value to a final value approximating the full line voltage and since the torque delivered by the polyphase motor is proportionally related to the magnitude of these terminal voltages, it is thus seen that by varying the amplitude of the D. C. control signal any desired torque output may be obtained with either direction of motor rotation. At any one time, the torque will be inversely proportional to the magnitude of that reactor which has had its inductance lowered by the magnetizing force produced by the above control signal.

It will also be seen that if the polyphase motor is coupled to a load requiring a constant torque, these same variations in the magnitude of the terminal voltages will be effective to cause the motor speed to vary from approximately synchronous to zero speed. If, as mentioned hereinbefore, the armature resistance of the motor is properly selected, the speed will vary in proportion to the input or terminal voltages, a characteristic which is highly desirable in the case of servo-control systems. Thus, by the simple expedient of varying the amplitude and polarity of the D. C. control signal applied at terminal 19, depending upon the external operating conditions and the design characteristics of the motor, variable output torque or variable speed may be realized with either direction of motor rotation.

Figure 2:
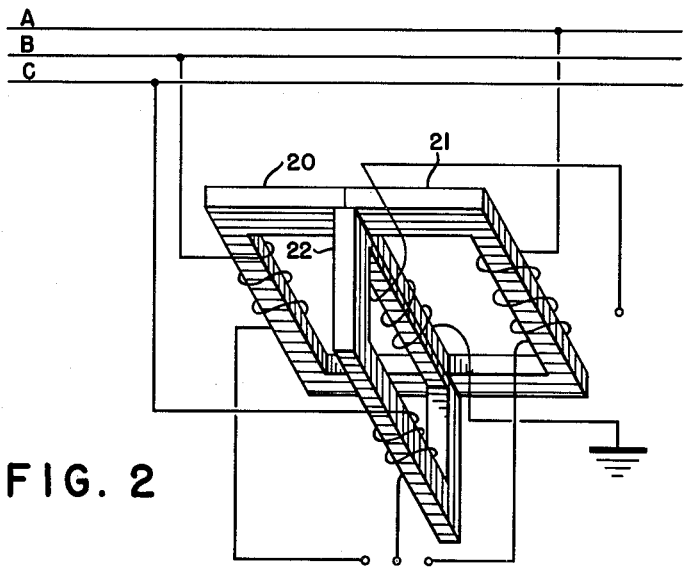
Fig. 2 illustrates an alternative construction of a three-phase saturable core reactor capable of use in the circuit of Fig. 1.

In Fig. 2, there is shown an alternative construction of the three-phase saturable core reactor utilized as the impedance control element in the circuit of Fig. 1. This polyphase reactor is composed of three similar rectangular sections, 20, 21 and 22, which are joined together to form a T-shaped core member. Each section carries its own A. C. winding and the common leg portion serves as the support for the various D. C. control windings. It will be noted that in this arrangement, and the same is true of the reactor in Fig. 1, the reaction of the A. C. circuit on the D. C. portion of the system is eliminated for the fluxes produced by the windings carrying the alternating currents, which are 120° displaced in phase, cancel out when combined in the common leg portion.

Figure 3:
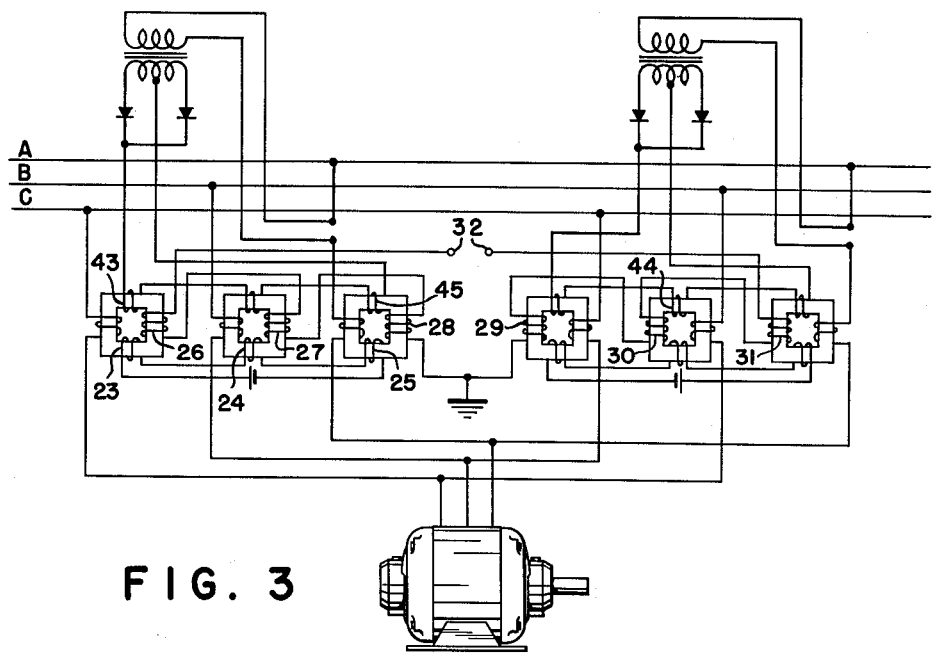
Fig. 3 illustrates a modified control system for regulating the torque and direction of rotation of a polyphase motor wherein a plurality of single-phase saturable core reactors constitute the impedance control elements.

Referring now to Fig. 3, there is shown a modification of the control system of Fig. 1 in which a plurality of single-phase saturable core reactors constitute the impedance control elements. Each single phase reactor may be of rectangular configuration, like the individual core sections forming the polyphase reactor of Fig. 2, and each has wound thereon separate bias and control windings, in addition to its conventional A. C. winding. The bias windings 23, 24 and 25 associated with the three reactors controlling the terminal voltages derived from phase sequence CBA may either be connected in a single series relationship so as to permit utilization of a single bias battery or may be separate and distinct, in which case individual bias batteries must be used. The D. C. control windings of these reactors, elements 26, 27 and 28, are wound in the same relative directions on their respective core members and then connected in an external series circuit. The D. C. control windings of the other three saturable core reactors, elements 29, 30 and 31, are likewise wound in the same relative directions on their core members; then these coils are connected in a series relationship with each other and with windings 26, 27 and 28 of the other reactors. Thus, when the D. C. control signal is applied across terminals 32, the magnetizing force created by this signal oppositely effects the magnetic polarization of the core members of each group, duplicating thereby the action present in the three-phase saturable core reactors of Fig. 1. In this circuit, too, the effect of the A. C. windings on the various D. C. control windings is eliminated. However, this result is accomplished by having the A. C. voltages induced in the D. C. windings cancel out by addition because of the series relationship existing between the latter windings.

The feedback technique utilized in the modification of Fig. 1 may, if desired, be incorporated into the control circuit disclosed in Fig. 3. In such case, the rectified output of each feedback transformer is supplied to a plurality of individual saturating windings, 43, 44 and 45, connected in a series relationship like bias windings 29, 30 and 31. These saturating windings are wound and the polarity and magnitude of the unidirectional feedback signal selected so that both of the above sets of windings normally cooperate to maintain the various single phase core members at the knee portion of their respective magnetization curves.

Although the system disclosed herein oppositely vary the inductance of the various reactors by winding the D. C. control coils in different directions on their core members, it should be understood that the same effect can be achieved by winding these coils in the same direction and either winding the bias windings in different directions or reversing the polarity of one of the bias batteries.

Obviously, many modifications and variations of the present invention are impossible in the light of the above teachings. It is therefore to be understood that within the scope of the appended claims the invention may be practiced otherwise than as specifically described.

What is claimed is:

1. In a motor control system the combination of a three-phase induction motor having first, second and third stator terminals, a three-phase source of power, first and second three-phase saturable core reactors each having first, second, and third windings and a central core section which is part of the flux paths of said first, second and third windings, means for connecting one end of each first winding to different phases of said three-phase source, means for connecting the other end of each first winding to said first stator terminal, means for connecting one end of each second winding to different phases of said three-phase source such that the first and second windings of each reactors are also connected to different phases of said three-phase source, means for connecting the other end of each second winding to said second stator terminal, means for connecting one end of each third winding to the remaining phase of said source, means for connecting the other end of each third winding to the third stator terminal whereby said motor is coupled simultaneously to said supply source over two different phase sequences corresponding to different directions of motor rotation and means for increasing the direct magnetic polarization of the core member of said first three-phase reactor while simultaneously decreasing the direct magnetic polarization of the core member of said second three-phase whereby one of said phase sequences is effective to institute motor rotation.

2. In a motor control system as defined in claim 1 wherein said means for increasing the direct magnetic polarization of the core member of said first reactor while simultaneously the direct magnetic polarization of said second reactor includes a bias winding mounted on the central core section of each reactor, said bias windings being wound in the same direction and energized in the same sense from equal unidirectional voltage sources whereby the cores of said reactors are initially biased to a degree of direct magnetic polarization such that the A. C. operating points of said reactors are in the vicinity of the knee portion of their magnetization curves, a control winding mounted on the central core section of each reactor, said control windings being wound in the same direction and connected in series across a source of voltage which is variable in magniture and polarity.

3. In a motor control system as defined in claim 2, first and second transformers, the input of said first transformer being connected in series with one of said third windings and the input of said second transformer being connected in series with the other of said third windings, means for rectifying the outputs of said transformers, a feedback winding mounted on the central core section of each reactor and means for energizing one of said feedback windings with the rectified output of said first transformer and the other of said feedback windings with the rectified output of said second transformer.

References Cited in the file of this patent

UNITED STATES PATENTS

| | | |
|---|---|---|
| 1,360,462 | Stoekle | Nov. 30, 1920 |
| 1,479,561 | Stoekle | Jan. 1, 1924 |
| 1,503,213 | Stoekle | July 29, 1924 |
| 1,844,704 | Thompson | Feb. 9, 1932 |
| 2,440,319 | Wickerhan | Apr. 27, 1948 |
| 2,550,569 | Lamm et al. | Apr. 24, 1951 |
| 2,558,086 | Herchenroeder | June 26, 1951 |
| 2,558,094 | King | June 26, 1951 |
| 2,559,538 | Jacobs | July 3, 1951 |
| 2,560,698 | Koeler | July 17, 1951 |
| 2,565,157 | Wickerham et al. | Aug. 21, 1951 |
| 2,676,292 | Spencer | Apr. 20, 1954 |
| 2,677,796 | Geyger | May 4, 1954 |
| 2,695,982 | Soller et al. | Nov. 30, 1954 |